US 6,595,454 B2
Jul. 22, 2003

(12) United States Patent
Roba et al.

(54) OPTICAL FIBER TENSIONING DEVICE AND METHOD OF CONTROLLING THE TENSION APPLIED TO AN OPTICAL FIBER

(75) Inventors: Giacomo Stefano Roba, Monza (IT); Roberto Pata, Bergamo (IT); Franco Veronelli, Lainate (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 92 days.

(21) Appl. No.: 09/748,854

(22) Filed: Dec. 28, 2000

(65) Prior Publication Data
US 2001/0033727 A1 Oct. 25, 2001

Related U.S. Application Data
(60) Provisional application No. 60/174,703, filed on Jan. 6, 2000.

(30) Foreign Application Priority Data
Dec. 29, 1999 (EP) .............................. 99126119

(51) Int. Cl.[7] .......................... B65H 59/38; B65H 23/16
(52) U.S. Cl. ............................ 242/412.2; 226/118.2; 242/154; 242/413.5; 242/419.7
(58) Field of Search .................... 242/419.7, 413.5, 242/154, 147 M, 412.2, 412.3; 226/118.2, 44

(56) References Cited

U.S. PATENT DOCUMENTS

| 3,713,009 A | * | 1/1973 | Poppinger et al. ....... 242/413.5 |
| 4,127,370 A | | 11/1978 | Jackson |
| 4,138,069 A | | 2/1979 | Bonzo et al. |
| 4,505,222 A | | 3/1985 | Holt et al. |
| 4,712,866 A | | 12/1987 | Dyott |
| 4,752,043 A | * | 6/1988 | Heinzer ..................... 242/412.2 |
| 4,793,564 A | * | 12/1988 | Hank et al. ............... 226/118.2 |
| 4,984,341 A | * | 1/1991 | Hagewood et al. ........... 226/44 |
| 5,076,104 A | | 12/1991 | Glaesemann et al. |
| 5,277,373 A | * | 1/1994 | Morton ........................ 226/44 |
| 5,602,747 A | * | 2/1997 | Rajala .......................... 226/44 |
| 5,725,174 A | * | 3/1998 | Kothmeier ............... 242/413.5 |
| 5,738,295 A | * | 4/1998 | Flamm et al. .............. 242/154 |
| 5,790,292 A | | 8/1998 | Otsuka et al. |
| 5,791,542 A | * | 8/1998 | Porat et al. ............... 226/118.2 |

FOREIGN PATENT DOCUMENTS

| EP | 0 254 462 | 1/1988 |
| EP | 0 483 661 | 5/1992 |

OTHER PUBLICATIONS

Shunichiro; "Method For Taking Up Optical Fiber", Patent Abstracts of Japan, of JP 10–001325, Jan. 6, 1998.

(List continued on next page.)

*Primary Examiner*—Michael R. Mansen
(74) *Attorney, Agent, or Firm*—Finnegan, Henderson, Farabow, Garrett & Dunner, L.L.P.

(57) ABSTRACT

An optical fibre tensioning device, receiving at its input an optical fibre from a traction device and capable of supplying the optical fibre from its output to a device for storing the fibre. The tensioning device comprises at least one fixed pulley on which the optical fibre is wound for a first length, and at least one movable pulley on which the optical fibre is wound for a second length. A device for measuring the tension applied to the fibre and a motorized device for moving the movable pulley interact with each other to control a distance (Dp) between axes of the pulleys in such a way as to automatically keep the tension applied to the fibre essentially constant.

29 Claims, 2 Drawing Sheets

OTHER PUBLICATIONS

Hisashi; "Winding Device For Optical Fiber Core", Patent Abstracts of Japan, of JP 08–324885, Dec. 10, 1996.

Kiyoshi; "Production Of Optical Fiber", Patent Abstracts of Japan, of JP 63–117925, May 21, 1988.

Satoshi; "Rewinder", Patent Abstracts of Japan, of JP 63–040741, Feb. 22, 1988.

Masaharu; "Process For Preventing Vibration Of Optical Fiber During Wire Drawing And Wire Drawing Device Therefor", Patent Abstracts of Japan, of JP 61–077632, Apr. 21, 1986.

Tamio; "Controlling Process Of Wire Drawing", Patent Abstracts of Japan, of JP 60–251145, Dec. 11, 1985.

Koji; "Method For Drawing Optical Fiber", Patent Abstracts of Japan, of JP 59–069439, Apr. 19, 1984.

Yukiyasu; "Apparatus For Screening Optical Fiber", Patent Abstracts of Japan, of JP 58–151342, Sep. 8, 1983.

Taku; "Drawing Line", Patent Abstracts of Japan, of JP 58–015042.

* cited by examiner

OPTICAL FIBER TENSIONING DEVICE AND METHOD OF CONTROLLING THE TENSION APPLIED TO AN OPTICAL FIBER

CROSS-REFERENCE TO RELATED APPLICATIONS

This application claims the priority of European Patent Application No. 99126119.9, filed Dec. 29, 1999, and the benefit of U.S. Provisional Application No. 60/174,703, filed Jan. 6, 2000, the content of each of which is incorporated herein by reference.

BACKGROUND OF THE INVENTION

1. Field of the Invention

The present invention relates to an optical fibre tensioning device and a method of controlling the tension applied to an optical fibre, particularly during the winding of the fibre.

2. Description of the Related Art

Typically, optical fibres are formed in draw towers from preforms of glass material. A draw tower is generally provided with a traction device ("capstan"), for example a motorized pulley, capable of drawing the optical fibre downwards and feeding it to a storage device; the latter usually comprises a motorized reel onto which the optical fibre is wound.

In many operating situations, the speed at which the optical fibre is drawn by the traction device (the drawing speed) may not coincide with the speed at which the optical fibre is fed into the storage device, for example owing to fluctuations of the speed of the motors which drive the traction device and the storage device. The difference between these speeds gives rise to variations of tension in the fibre with respect to a target tension; in particular, a fibre tension greater than the target tension may damage the fibre, while a tension lower than the target tension may make the storage process inefficient.

To solve this problem, there is a known practice of using tensioning devices which are to be interposed between the traction device and the storage device and are capable of controlling the tension of the optical fibre. In particular, there are known tensioning devices comprising at least one fixed pulley and one movable pulley which can guide the optical fibre. The movement of the movable pulley enables the tension of the optical fibre to be modified. Here and in the remainder of the description, the term "fixed pulley" denotes a pulley which is free to rotate about its axis and in which the position of the axis is fixed, while the term "movable pulley" denotes a pulley which is free to rotate about its axis and in which the position of the axis is variable.

U.S. Pat. No. 4,712,866 describes a tensioning device positioned between a traction device of a draw tower and a storage device comprising a take-up reel. This tensioning device comprises a pair of fixed pulleys and a movable pulley located on an oscillating arm, also called a "dancer arm", which carries a weight. The dancer arm actuates a conventional speed control so that the fibre is wound onto the take-up reel at a tension determined by the aforesaid weight.

U.S. Pat. No. 5,790,292 relating to an optical fibre transmission line describes, among other things, a draw tower in which a tensioning device with two pulleys is interposed between a traction device and a take-up reel (FIG. 7).

U.S. Pat. No. 4,138,069 describes a winding device for optical glass filaments in which a traction device draws the filament from a source of molten glass and feeds it through a tensioning device to a set of take-up reels. The tensioning device comprises two fixed pulleys and one movable pulley mounted on one end of a dancer arm. The dancer arm extends from an apparatus in which a spring or other means applies a constant force to move the movable pulley away from the fixed pulleys.

Tensioning devices can also be used in apparatus other than draw towers.

U.S. Pat. No. 5,076,104 describes an apparatus for measuring the load at failure of an optical fibre, in which tensioning devices comprising a pair of fixed pulleys and one movable pulley are provided. Also provided is a tensioning device comprising one fixed grooved wheel and one movable grooved wheel; the latter is positioned below the fixed grooved wheel, is movable in a vertical direction and is connected to a predetermined weight. The optical fibre, which in its path is wound around both the fixed grooved wheel and the movable grooved wheel, is thus kept at a constant tension.

U.S. Pat. No. 4,505,222 describes an extrusion coating device for optical fibres, in which a tensioning device is positioned immediately upstream of a take-up reel.

U.S. Pat. No. 4,127,370 describes an extrusion coating apparatus for an optical fibre, in which a first, a second and a third pulley are positioned at the entry to the apparatus, immediately downstream of the fibre take-off reel. The first and second pulley are spaced apart from each other and from the take-off reel. The third pulley has no support and is carried on the optical fibre between the first and second pulley, in such a way that the fibre passes, as a result of the weight of the third pulley, along a U-shaped path between the first and second pulley. A pair of photocells is used to detect the vertical position of the third pulley and to control the speed of rotation of the take-off reel in such a way that the vertical position of the third pulley, and therefore the tension of the fibre, remains essentially constant.

SUMMARY OF THE INVENTION

The applicant has observed that tensioning devices of known types, requiring the use of gravity and/or predetermined elastic action for controlling the position of the movable pulley, apply an uncontrollable predetermined force to the movable pulley. Therefore it is not possible to modulate in any way the force applied to the movable pulley in order to modify the response of the tensioning device. Consequently, the tension control obtained by means of the known devices, being of the non-modulatable type, might be inadequate in some operating conditions.

The applicant has found that the aforesaid problem can be at least partially overcome by using an optical fibre tensioning device in which there is a movable pulley on which the optical fibre runs, a device for measuring the tension applied to the optical fibre and a device for moving the movable pulley, capable of controlling the position of the movable pulley in accordance with the signal generated by the tension measuring device.

The tensioning device according to the present invention is capable of receiving at its input an optical fibre from a fibre guide or return element or from a device of another type, for example a traction device or a take-off device, and is capable of supplying the optical fibre from its output, after having automatically controlled its tension, to a further guide or return element, or to a further device, for example a storage device (particularly a reeling device) for the optical fibre.

In greater detail, the tensioning device according to the present invention comprises a fixed pulley carried by a supporting structure and a movable pulley carried by a slide which is slidable along a rectilinear guide carried by the supporting structure.

The optical fibre entering the tensioning device is wound around the fixed pulley for a certain length, and passes from here to the movable pulley around which it is wound for a further length. The distance between the axes of the fixed pulley and the movable pulley is variable to modify the length of the portion of fibre which extends between the two pulleys and consequently the tension applied to the fibre. To vary the distance between the axes of the fixed pulley and the movable pulley there are used, as mentioned above, a fibre tension measuring device, for example a load cell associated with the fixed pulley, and a device for moving the slide which can control the distance between the axes of the pulleys in accordance with the signal supplied by the tension measuring device, to automatically keep the tension in the fibre practically constant. The movement device can comprise an electric motor and a system for transmitting the motion from the motor to the slide, for example a screw and nut coupling in which the screw extends parallel to the rectilinear guide and is rotationally movable by the force of the motor and in which the nut is coupled to the slide, or a belt transmission, for example a toothed belt transmission.

Since it automatically controls the tension of the fibre without using the force of gravity or other predetermined forces, the aforesaid optical fibre tensioning device can be used to modulate in the desired way the tension applied to the optical fibre.

In this way, the movement of the movable pulley is made entirely independent of the force of gravity or predetermined elastic forces, and is achieved by the application of a controllable force.

Thus a tensioning device which automatically adapts itself to any variation of the operating conditions is provided.

In a first aspect, the present invention relates to an optical fibre tensioning device, for use in an optical fibre advance path, comprising at least one movable pulley around which the optical fibre is wound for a certain length at least; the position of the said movable pulley being variable to modify the tension applied to the optical fibre, and additionally comprising a tension measuring device capable of measuring the said applied tension and of generating a signal indicating the tension, and a motorized device for moving the said movable pulley, capable of receiving the said signal indicating the tension and of moving the movable pulley in accordance with the said signal indicating the tension, to automatically keep the tension applied to the optical fibre essentially constant.

Preferably, the tensioning device also comprises a fixed pulley around which the optical fibre is wound for a certain length at least, the distance between the axes of the said fixed pulley and the said movable pulley being variable to modify the tension applied to the optical fibre, and the said motorized movement device being capable of controlling the said distance to automatically keep the tension applied to the optical fibre essentially constant.

The said motorized movement device may comprise a guide along which a slide supporting the said movable pulley can be moved and an actuator device for moving the said slide along the said guide.

The said actuator device may comprise a screw movable rotationally by the force of an electric motor and a nut connected to the said slide, or an electric motor and a motion transmission system of the belt type (for example, one using a toothed belt) to connect the motor to the slide.

The tensioning device may comprise an electronic control device which receives reference signals and measurement signals at its input, and is capable of generating, in response to the said input signals, operating signals for the closed-loop control of the said motorized movement device.

The said electronic control device is preferably a device for the closed-loop control of the tension applied to the optical fibre, comprising:

a subtractor to which is supplied a tension reference signal, proportional to a target tension of the optical fibre, and a measurement signal, consisting of the said signal indicating the tension of the optical fibre; and a controller, preferably a proportional-integral derivative controller, receiving at its input a tension error signal supplied from the output of the said subtractor, and generating at its output a drive signal which can be used to operate the said motorized movement device and to control the said distance.

Thus a closed-loop control of the tension present in the fibre is provided, by means of which this tension is constantly monitored, causing an immediate intervention of the movement device whenever the measured tension deviates from the reference tension. The tension in the fibre is thus kept constantly equal to the reference tension, providing a particularly precise control.

Advantageously, the said tension measuring device may comprise a load cell connected to the said fixed pulley and capable of generating at its output the said signal indicating the tension.

Preferably, the said motorized movement device comprises a guide along which a slide supporting the said movable pulley can be moved, and an actuator device for moving the said slide along the said guide; the said electronic control device implementing a system for the closed-loop control of the position of the said slide along the said guide.

Preferably, the tensioning device is connected for operation to a device for storing the optical fibre, capable of receiving the optical fibre from the tensioning device, and the said system for the closed-loop control of the position of the said slide along the said guide comprises:

a further subtractor to which is supplied a position reference signal, correlated with a reference position of the said slide along the said guide, and a measurement signal, proportional to the actual position of the said slide along the said guide; and a further controller, preferably a proportional-integral derivative controller, receiving at its input a position error signal supplied from the output of the said further subtractor, and generating at its output a further drive signal which can be used to operate the said storage device.

The said storage device preferably comprises at least one motorized reel on which the optical fibre from the said tensioning device is wound, the said motorized reel being rotationally movable about an axis of rotation under the action of an electric motor, and the said further drive signal being usable for the control of the said electric motor.

The said electronic control device preferably comprises an integrator receiving at its input a signal correlated with the speed of movement of the said slide along the said guide and generating at its output the said measurement signal proportional to the actual position of the said slide along the said guide.

In this way, it is ensured that the movable pulley is always kept in the proximity of a reference position from which it is always possible to move the movable pulley in a useful way to compensate for a variation of tension; thus the slide is not permitted to be positioned at a terminal position at which it is no longer possible to move the movable pulley in one of the directions of movement.

In a further aspect, the present invention relates to a method of controlling the tension applied to an optical fibre along a path of advance of an optical fibre, the said method comprising the stage of forming a portion of the said path having a length which can be varied to modify the tension applied to the said fibre, and the stages of measuring the tension applied to the optical fibre and controlling the said length in an automatic way, by means of a motor, in accordance with the said measured tension, to keep the tension of the optical fibre practically constant.

Preferably, the method comprises the stage of closed-loop control of the tension applied to the said optical fibre in accordance with at least one reference signal, proportional to a target tension of the fibre, and a measurement signal which is generated in this stage of measuring the tension and is proportional to the tension to which the optical fibre is actually subjected.

The said stage of closed-loop control of the tension preferably comprises the stages of:

comparing the said tension reference signal with the said measurement signal, generating a tension error signal; and processing the said error signal, generating at the output a drive signal which can be used to modify the said length by means of a motor and to keep the tension in the fibre essentially constant.

The method preferably comprises the stage of closed-loop control of the position of a movable member in accordance with at least one position reference signal which is proportional to a target position of the said movable member, and a measurement signal which is proportional to the instantaneous position of the said movable member, the variation of the position of the said movable member causing the variation of the said length.

The method preferably also comprises the stage of storing the optical fibre at the end of the said advance path; the said stage of closed-loop control of the position of the said movable member comprises the stages of:

comparing the said position reference signal with the said position measurement signal, generating a position error signal; and processing the said position error signal, generating at the output a drive signal which can be used to modify the speed at which the optical fibre is stored.

In a further aspect, the present invention relates to an optical fibre processing system, for example a draw tower, an extrusion line or an apparatus for measuring the breaking strength of an optical fibre, in which there is an optical fibre tensioning device capable of receiving at its input an optical fibre from a source of optical fibre, for example an optical fibre traction device, and capable of supplying the optical fibre from its output to a device for storing the optical fibre, for example a motorized reel, the said tensioning device comprising at least one movable pulley around which the said optical fibre is wound for a certain length at least, the position of the said movable pulley being variable to modify the tension applied to the said fibre, the tensioning device additionally comprising a tension measuring device capable of measuring the said applied tension and of generating a signal indicating the tension, and a device for the motorized movement of the said movable pulley which is capable of receiving the said signal indicating the tension and of moving the movable pulley in accordance with the said signal indicating the tension to automatically keep the tension in the fibre practically constant.

Preferably, the system comprises an electronic control device capable of providing a system of closed-loop control of the tension applied to the optical fibre, and comprising:

a subtractor to which is supplied a tension reference signal, proportional to a target tension of the optical fibre, and a measurement signal, consisting of the said signal indicating the tension; and a controller, preferably a proportional-integral derivative controller, receiving at its input a tension error signal supplied from the output of the said subtractor, and generating at its output a drive signal which can be used to operate the said motorized movement device.

Preferably, the said motorized movement device comprises a guide, along which a slide supporting the said movable pulley can be moved, and an actuator device for moving the said slide along the said guide; the said electronic control device providing a system of closed-loop control of the position of the said slide along the said guide.

Preferably, the tensioning device is connected for operation to the optical fibre storage device, and the said system for the closed-loop control of the position of the said slide along the said guide comprises:

a further subtractor to which is supplied a position reference signal, correlated with a reference position of the said slide along the said guide, and a measurement signal, proportional to the actual position of the said slide along the said guide; and a further controller, preferably a proportional-integral derivative controller, receiving at its input a position error signal supplied from the output of the said further subtractor, and generating at its output a further drive signal which can be used to operate the said storage device.

BRIEF DESCRIPTION OF THE DRAWINGS

The invention will now be illustrated with particular reference to the attached drawings which represent, without restriction, a preferred embodiment of the invention in which.

DETAILED DESCRIPTION OF THE INVENTION

Figure 1:
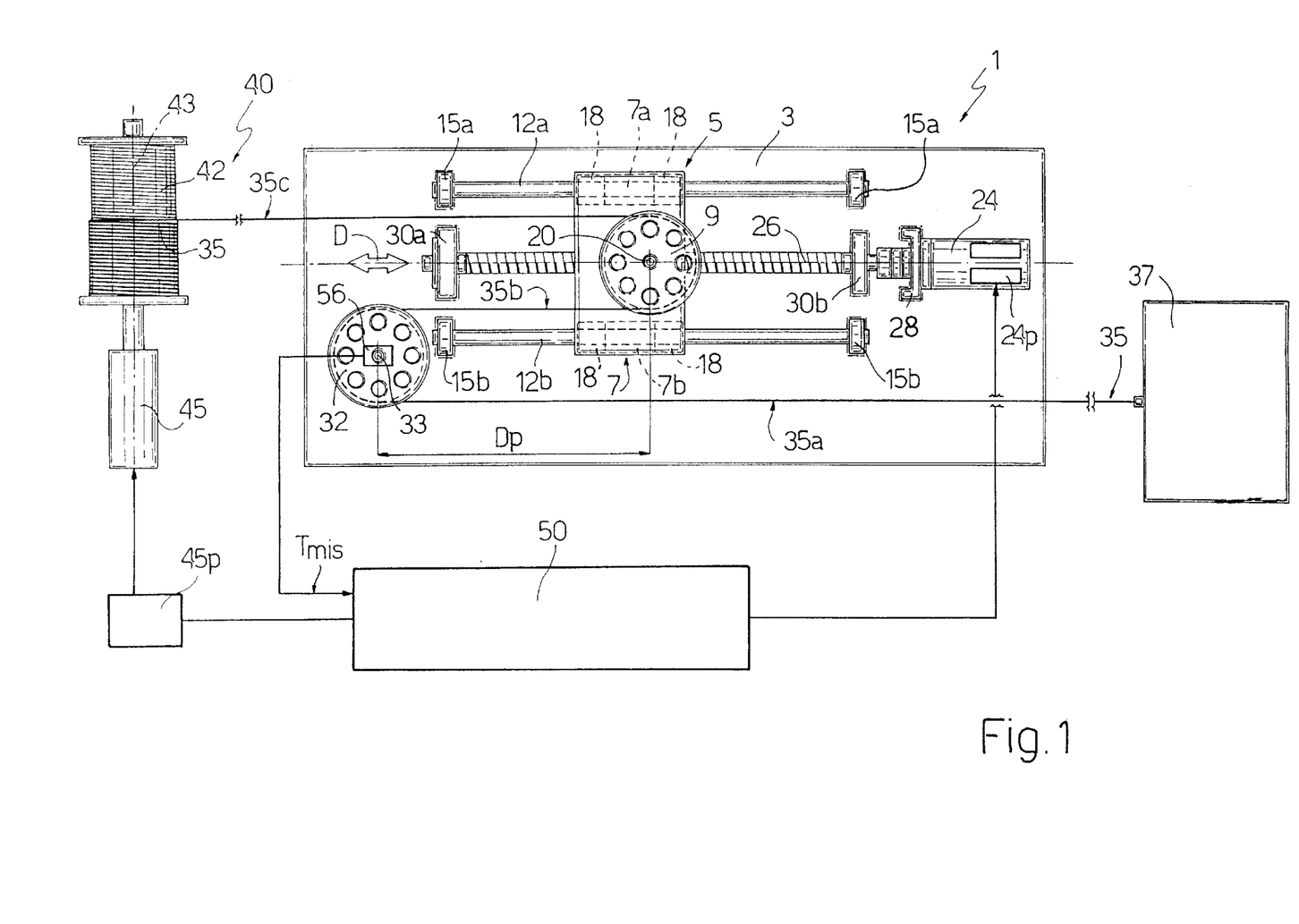
FIG. 1 shows, in plan view, a tensioning device for optical fibres, made according to the present invention.

In FIG. 1, the number 1 indicates, as a whole, an optical fibre tensioning device.

The tensioning device 1 comprises a supporting panel 3 (made from metal, for example) carried by a frame (not illustrated) which allows it to be positioned in a fixed way, for example in a horizontal or a vertical position.

The tensioning device 1 also comprises at least one rectilinear guide 5, which in this particular case is formed by two cylindrical rods 12a, 12b carried by the supporting panel 3, and a slide 7 movable with a reversible motion along the rectilinear guide 5 and supporting a first pulley 9, referred to hereafter as the movable pulley. The direction of movement of the slide 7 is indicated by D in FIG. 1.

The cylindrical rods 12a, 12b are positioned parallel to each other, and have their respective end portions carried by pairs of supports 15a, 15b fixed to the supporting panel 3. The slide 7 can have a rectangular shape in plan view, and can be provided with sliding elements 7a, 7b engaged with the rods 12a, 12b respectively; for example, the slidable engagement between the slide 7 and the rods 12a, 12b can be formed by means of sliding bearings 18, or ball-bearing collars.

The movable pulley 9 is preferably carried by a pin 20 which extends from, and is perpendicular to, the slide 7, in such a way that the axis of rotation of the movable pulley 9 is perpendicular to the direction D of movement of the slide 7.

The slide 7 can be moved by the force of an electrical motor 24, preferably a motor having an output shaft connected to a screw 26 located between the rods 12a, 12b and extending parallel to these. The motor 24 can be mounted in a projecting way on a bracket 28 fixed to the panel 3, and the ends of the screw 26 are preferably supported by corresponding supports 30a, 30b which are also fixed to the panel 3. Advantageously, the screw 26 is coupled to a circulating ball nut (not illustrated) fixed to the slide 7 on the side opposite the movable pulley 9.

Alternatively, the transmission of motion from the motor 24 to the movable pulley 9 could be provided by means of a belt transmission, with a toothed belt for example (not illustrated).

The tensioning device 1 also comprises a second pulley 32, referred to hereafter as the fixed pulley, carried by a pin 33 which preferably extends perpendicularly to the panel 3, for example in a portion of the panel 3 opposite that occupied by the motor 24.

The fixed pulley 32 preferably has the same diameter as the movable pulley 9, and the axes of rotation of the pulleys 9 and 32 are preferably parallel to each other.

The angular rotation of the electric motor 24 produces the linear movement of the slide 7 along the guide 5, thus modifying the distance Dp between the axes of rotation of the movable pulley 9 and the fixed pulley 32.

In particular, the distance Dp is continuously variable between a minimum value (DpMin) for which the slide 7 is located at a first terminal position (not illustrated) in which it bears on the brackets 15a, 15b which are farther from the motor 24, and a maximum value (DpMax) for which the slide 7 is located at a second terminal position (not shown) at which it bears on the brackets 15a, 15b which are closer to the motor 24.

The tensioning device 1 can also comprise a transparent protective enclosure (carter—not shown) which can be connected to the supporting panel 3 and can house all the parts carried by the panel 3.

The tensioning device 1 is capable of being fitted in an advance path of an optical fibre 35, for example in a draw tower (not illustrated) for the optical fibre, and is capable of receiving the optical fibre from a source of optical fibre 37 (shown schematically). In the non-restrictive example considered here, the source of optical fibre 37 is a traction device ("capstan") of an optical fibre draw tower (not illustrated). Alternatively, the source of optical fibre 37 could be any member or device for returning or guiding the optical fibre, or an optical fibre take-off reel.

The optical fibre 35 extends from the traction device 37 to the fixed pulley 32, forming a first rectilinear portion 35a, is wound (through 180° for example) around the fixed pulley 32, extends between the fixed pulley 32 and the movable pulley 9, forming a second rectilinear portion 35b, is wound (through 180° for example) around the movable pulley 9, and finally extends between the movable pulley 9 and a further device 40, thus forming a third rectilinear portion 35c. In the non-restrictive example considered here, the device 40 (shown schematically) is a storage device comprising a motorized reel 42 on to which the optical fibre 35 can be wound. The motorized reel 42 is movable rotationally about an axis of rotation 43 under the action of an electric motor 45. Alternatively, the device 40 can be any member or device for returning or guiding the optical fibre.

Preferably, but not necessarily, the rectilinear portions 35a, 35b, 35c are parallel to each other.

Between the device 37 and the tensioning device 1, and between the tensioning device 1 and the device 40, there may advantageously be return pulleys which, for simplicity, are not shown in FIG. 1.

An electronic control unit 50 is capable of controlling, through corresponding power driver circuits ("drivers") 24p, 45p, the electric motor 24 and the electric motor 45.

Advantageously, the tensioning device 1 comprises a tension measuring device 56, for example a load cell, preferably connected to the pin 33 of the fixed pulley 32. The tension measuring device 56 is capable of generating a signal Tmis proportional to the tension to which the optical fibre 35 is subjected, and is connected to the electronic control unit 50 to supply the signal Tmis to the electronic control unit 50.

Figure 2:
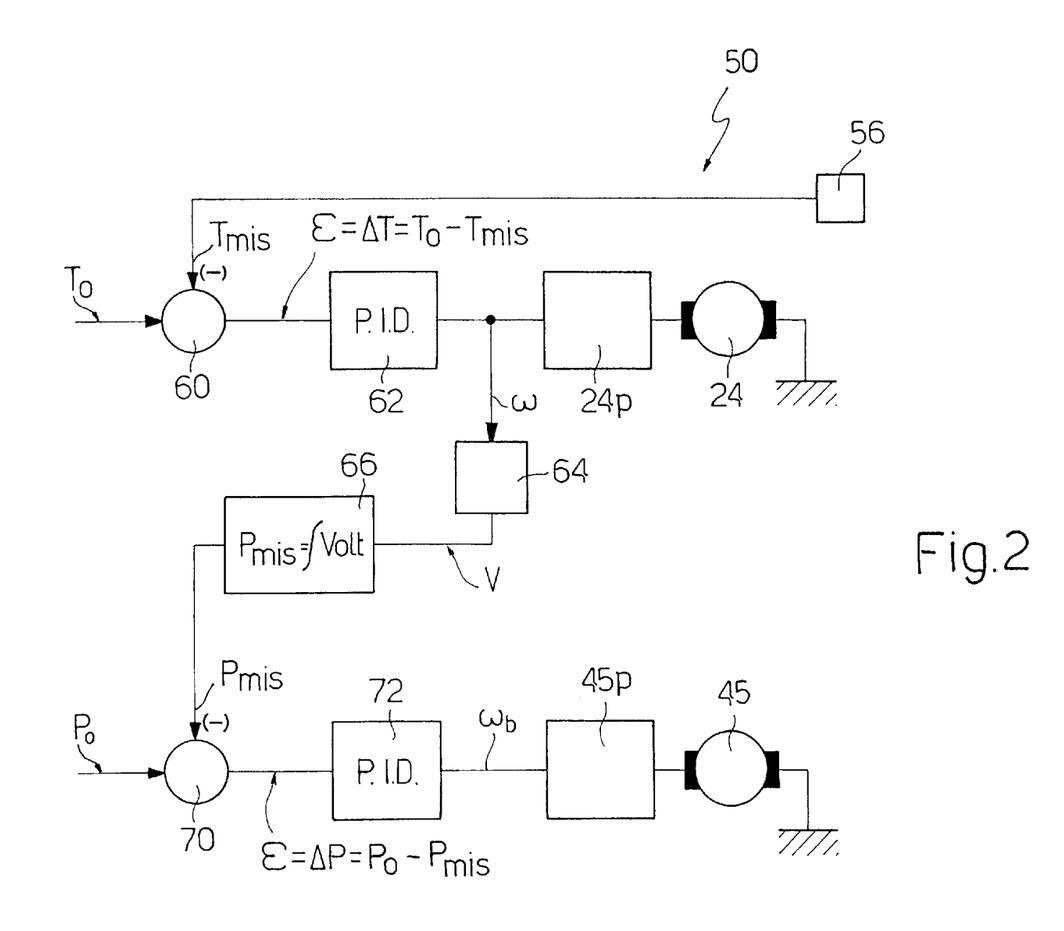
FIG. 2 shows a block diagram of an electronic unit for controlling the device of FIG. 1, made according to the present invention.

With particular reference to FIG. 2, the electronic unit 50 is illustrated in detail. The electronic unit 50 comprises a subtractor 60 to which is supplied a signal $T_0$, proportional to a target tension of the fibre, and the signal Tmis, proportional to the tension to which the optical fibre 35 is actually subjected. The subtractor 60 generates at its output an error signal $\epsilon = \Delta T = T_0 - Tmis$ (tension error) and supplies this error signal to a controller 62, particularly a PID (proportional-integral derivative) controller, which generates at its output a signal ω (a voltage signal, compatible with the drive circuit 24p which is operated by means of voltage).

A PID controller is a controller which, having received an input signal $S_i$, generates an output signal $S_o$, typically given by:

$$S_o(t) = K_p \cdot \left( S_i(t) + \frac{1}{T_i} \int_0^t S_i(t) \cdot dt + T_d \cdot \frac{dS_i(t)}{dt} \right).$$

A PID controller can therefore be identified by the three constants $K_p$, $K_i = K_p/T_i$ and $K_d = K_p \cdot T_d$.

The signal ω is used, after having been converted and transformed into a power signal by the drive circuit 24p (of a known type), to operate the motor 24. The speed of rotation of the motor 24 is therefore correlated with the signal ω. The signal ω is also supplied to a conversion unit 64, which generates at its output a signal V correlated with the linear speed of movement of the slide 7 along the guide 5.

In practice, if $v_{max}$ is the maximum speed of the motor 24 (expressed in r.p.s.), $\omega_{max}$ is the (electric voltage) value of the signal ω with which the maximum speed $v_{max}$ is associated, p is the pitch of the screw 26 and ω(t) is the generic value of the signal ω at the instant t (supplied from the output of the controller 62), the conversion unit 64 generates at its output a signal V whose value V(t) at the instant t is given by:

$$V(t) = \frac{v_{max}}{\omega_{max}} \cdot \omega(t) \cdot p$$

In practice, the conversion unit 64 implements the transfer function which relates the angular rotation of the screw 26 to the linear speed of the slide 7.

The signal V is supplied to a further conversion unit 66, which, by integrating the signal V, generates at its output a signal Pmis (electric voltage) relating to the instantaneous position of the slide 7 along the guide 5.

The position signal Pmis is supplied to a subtractor 70 to which a signal $P_0$, proportional to a target position of the slide 7 along the guide 5, is also supplied. Preferably, the target position of the slide is the position intermediate between the first and second terminal positions.

The subtractor 70 generates at its output an error signal $\epsilon = \Delta P = P_0 - P_{mis}$, and supplies this error signal to a controller 72 (in particular, a PID (proportional-integral derivative) controller), which generates at its output a signal ωb which is used, after having been converted and transformed into a power signal by the drive circuit 45p (of a known type), to operate the motor 45. The signal ωb is correlated with the speed of rotation of the reel 42.

In operation, when the storage device imparts to the incoming optical fibre 35 a higher speed than the speed at which it is supplied from the output of the traction device 37, the tension Tmis in the fibre increases and deviates from the target value $T_0$.

Consequently, the tension error ΔT (which is negative in this case) increases in absolute value, and the controller 62, through the drive circuit 24p, causes a rotation of the motor 24 such that the slide 7 is made to move towards the first terminal position, and consequently the distance Dp and the length of the portion 35b of fibre located between the two pulleys 9 and 32 are decreased; the decrease of the length of the portion 35b is thus opposed to the increase of tension in the fibre, in such a way that the tension in the fibre is kept essentially constant.

Conversely, when the storage device 40 imparts to the incoming optical fibre 35 a lower speed than the speed at which it is supplied from the output of the traction device 37, the tension Tmis in the fibre decreases and deviates from the target value $T_0$. Consequently, the tension error ΔT (which is positive this time) increases, and the controller 62, through the drive circuit 24p, causes a rotation of the motor 24 such that the slide 7 is made to move towards the second terminal position, and consequently the distance Dp and the length of the portion 35b are increased; the increase of the length of the portion 35b is opposed to the decrease of tension in the fibre in such a way that the tension in the fibre is kept essentially constant.

Thus a motorized closed-loop control of tension is provided, which returns the tension in the fibre to the target value $T_0$.

Additionally, the unit 66, by integrating the signal V (correlated with the linear speed of the slide 7), determines the instantaneous position Pmis of the slide 7 along the guide 5. This instantaneous position is compared with the objective position $P_0$, and the position error ΔP, processed by the conversion unit 72, produces a variation of the speed of rotation of the motor 45. In particular, when the slide 7 is closer than the reference position to the first terminal position (with the slide 7 moved to the left in FIG. 1), the control system produces a decrease of the speed of rotation of the motor 45 in such a way that the tension in the fibre 35 decreases and the tension control loop, in order to compensate for this variation of tension, moves the slide 7 (by means of the motor 24 and the screw 26) towards the second terminal position (in other words to the right in FIG. 1), thus compensating for the variation of position.

Additionally, when the slide 7 is closer than the reference position to the second terminal position (with the slide 7 moved to the right in FIG. 1), the control system produces an increase of the speed of rotation of the motor 45 in such a way that the tension in the fibre 35 increases and the tension control loop, in order to compensate for this variation of tension, moves the slide 7 (by means of the motor 24 and the screw 26) towards the first terminal position (in other words to the left in FIG. 1), thus compensating for the variation of position.

Thus a closed-loop position control is provided, which returns the slide to the target position $P_0$.

If preferred, the position controller could be dispensed with; in this case, the control device would not include the elements indicated by the numbers 64, 66, 70, 72 and 45p.

The above description clearly shows the advantages of the present invention, in that the movement of the movable pulley 9 depends solely on the action of the electric motor 24 and is entirely independent of the force of gravity or other predetermined forces (of the elastic type, for example) applied to the movable pulley 9. This, a force whose value can be automatically controlled in accordance with the operating signal applied to the motor 24 is applied to the optical fibre 35. The tensioning device 1 adapts itself automatically to any change in operating requirements (such as a change in the drawing speed, or a change in the position of the slide 7) and returns the value of the tension applied to the fibre to a target value.

Additionally, it is ensured that the movable pulley 9 is always kept close to a reference position (in particular, the central position of the guide 5) from which it can always be moved in a useful way (to the right or to the left) to effectively oppose a change in tension. In other words, the slide 7 is prevented from being positioned close to the first or second terminal position, where the movement of the slide in one of the two directions is no longer possible.

The tensioning device 1 can be used in apparatus of different types, for example in a draw tower, in an extrusion line or in a test apparatus (also known as a "screening apparatus") for testing the optical fibre in respect of the breaking stresses.

A draw tower typically comprises a furnace for melting a preform of glass material, a traction member (or "capstan", for example one of the single pulley or double pulley type) for drawing downwards the optical fibre generated from the melted preform, a coating device positioned between the furnace and the traction member to apply a protective surface coating (typically made from acrylate) to the optical fibre, and a fibre take-up reel receiving the fibre from the traction member. The tensioning device 1 can advantageously be positioned, as mentioned above, between the traction member and the take-up reel.

An extrusion line is a processing line along which a plurality of optical fibres are made to advance with a wire-shaped supporting element, and along which a polymer material is extruded over the supporting element in such a way as to incorporate the optical fibres and hold them in a fixed position around the supporting element, thus forming the optical core of an optical cable. An extrusion line typically comprises a take-off reel for the supporting element, a plurality of fibre take-off reels, an extruder capable of receiving both the fibres and the supporting element at its inlet, a cooling vessel receiving from the extruder the optical core formed in the extruder, and a final take-up reel. In an extrusion line, the tensioning device 1 can, for example, be positioned downstream of each of the fibre take-off reels.

A screening apparatus is typically used to check that the fibre is capable of withstanding predetermined tensions, and is therefore free of significant structural defects. A screen apparatus typically comprises a take-off reel for the optical fibre, a take-up reel for the optical fibre and a plurality of guide and/or return elements capable of forming a path for the optical fibre between the take-off and take-up reels and capable of imparting a predetermined tension to the optical fibre during its passage. In a screening apparatus, the device 1 can be positioned at any point of the aforesaid path.

Finally, it is clear that modifications and variations can be made to the tensioning device described without departing from the scope of protection of the present invention.

In particular, the system for moving the slide 7 (screw 26 and nut coupled to the slide 7) could be different from that described, and could comprise, for example, a toothed belt (not illustrated) connected to the slide 7 and movable between two end pulleys.

Finally, the position Pmis of the slide 7 along the guide 5 could be determined not in an indirect way (in other words, following the measurement of the speed) as illustrated in FIG. 2, but in a direct way, using a row of position sensors (not illustrated), for example a row of photocells, or an optical strip (in other words a linear photosensitive component, for example a linear CCD—not illustrated), arranged along the guide 5.

What is claimed is:

1. An optical fibre tensioning device for use in a path of advance of the optical fibre, comprising:
   at least one movable pulley around which the optical fibre is wound for a first length, the position of said movable pulley being variable to modify the tension applied to the optical fibre;
   a tension measuring device capable of measuring applied tension and of generating a signal indicating the tension (Tmis); and
   a motorized movement device capable of receiving said signal indicating the tension (Tmis) and of moving the movable pulley in accordance with said signal indicating the tension (Tmis) to automatically keep the tension applied to the optical fibre essentially constant.

2. The optical fibre tensioning device according to claim 1, further comprising:
   a fixed pulley around which the optical fibre is wound for a second length;
   wherein a distance (Dp) between axes of said fixed pulley and of said movable pulley is variable to modify the tension applied to the optical fibre; and
   wherein said motorized movement device is capable of controlling said distance (Dp) to automatically keep the tension applied to the optical fibre essentially constant.

3. The optical fibre tensioning device according to claim 2, wherein said motorized movement device comprises a guide along which a slide supporting said movable pulley is capable of being moved, and an actuator device for moving said slide along said guide.

4. The optical fibre tensioning device according to claim 3, wherein said actuator device comprises a screw rotationally movable under the force of an electric motor and a nut coupled to said slide.

5. The optical fibre tensioning device according to claim 2, further comprising an electronic control device which receives at least one reference signal and at least one measurement signal at an input, and is capable of generating, in response to said input signals, operating signals for a closed-loop control of said motorized movement device.

6. The optical fibre tensioning device according to claim 5, wherein said electronic control device forms a system for closed-loop control of the tension applied to said optical fibre, comprising:
   a subtractor, receiving at its input a tension reference signal ($T_0$) proportional to a target tension of the optical fibre and a measurement signal (Tmis) proportional to the tension to which the optical fibre is subjected, and generating at its output a tension error signal ($\epsilon = \Delta T = T_0 - Tmis$); and
   a controller, receiving at its input the tension error signal ($\epsilon = \Delta T = T_0 - Tmis$) supplied from the output of said subtractor, and generating at its output a drive signal ($\omega$) capable of operating said motorized movement device to vary said distance (Dp).

7. The optical fibre tensioning device according to claim 6, wherein said controller comprises a proportional-integral derivative controller.

8. The optical fibre tensioning device according to claim 6, wherein said tension measuring device comprises a load cell connected to said fixed pulley and capable of generating at its output said signal (Tmis) proportional to the tension to which the optical fiber is subjected.

9. A method of controlling tension applied to an optical fibre along a path of advance of an optical fibre, comprising:
   forming a portion of said path having a length (Dp) capable of being varied to modify the tension applied to said fibre;
   measuring the tension applied to the optical fibre; and
   controlling said length (Dp) in an automatic way, by means of a motor, in accordance with said measured tension to keep the tension applied to the optical fibre essentially constant.

10. The method according to claim 9, wherein said controlling comprises performing closed-loop control of the tension applied to said optical fibre in accordance with at least one reference signal (To) proportional to a target tension of the fibre, and a measurement signal (Tmis) generated in measuring the tension and proportional to the tension to which the optical fibre is actually subjected.

11. The method according to claim 10, wherein said performing closed-loop control of the tension comprises:
   comparing said at least one tension reference signal ($T_0$) with said measurement signal (Tmis);
   generating a tension error signal ($\epsilon = \Delta T = T_0 - Tmis$);
   processing said tension error signal ($\epsilon = \Delta T = T_0 - Tmis$); and generating at an output a drive signal ($\omega$) capable of varying said length (Dp) by means of a motor and keeping the tension in the fibre essentially constant.

12. An optical fibre processing system, comprising:
   a source of optical fibre;
   an optical fibre tensioning device capable of receiving at its input the optical fibre from the source of optical fibre and for use in a path of advance of an optical fibre, wherein the optical fibre tensioning device comprises:
      at least one movable pulley around which the optical fibre is wound for a first length, the position of said movable pulley being variable to modify the tension applied to the optical fibre;

a tension measuring device capable of measuring applied tension and of generating a signal indicating the tension (Tmis); and a motorized movement device capable of receiving said signal indicating the tension (Tmis) and of moving the movable pulley in accordance with said signal indicating the tension (Tmis) to automatically keep the tension applied to the optical fibre essentially constant; and a device for storing the optical fibre, wherein the storage device receives the optical fibre from the tensioning device.

13. The optical fibre processing system according to claim 12, wherein the optical fibre tensioning device further comprises a fixed pulley around which the optical fibre is wound for a second length;

wherein a distance (Dp) between axes of said fixed pulley and of said movable pulley is variable to modify the tension applied to the optical fibre; and wherein said motorized movement device is capable of controlling said distance (Dp) to automatically keep the tension applied to the optical fibre essentially constant.

14. The optical fibre processing system according to claim 13, wherein said motorized movement device comprises a guide along which a slide supporting said movable pulley can be moved, and an actuator device for moving said slide along said guide.

15. The optical fibre processing system according to claim 14, wherein said actuator device comprises a screw rotationally movable under the force of an electric motor and a nut coupled to said slide.

16. The optical fibre processing system according to claim 13, further comprising an electronic control device which receives at least one reference signal and at least one measurement signal at an input, and is capable of generating, in response to said input signals, operating signals for a closed-loop control of said motorized movement device.

17. The optical fibre processing system according to claim 16, wherein said electronic control device forms a system for closed-loop control of the tension applied to said optical fibre, comprising:

a subtractor, receiving at its input a tension reference signal ($T_0$) proportional to a target tension of the optical fibre and a measurement signal (Tmis) proportional to the tension to which the optical fibre is subjected, and generating at its output a tension error signal ($\epsilon=\Delta T=T_0-Tmis$); and a controller, receiving at its input the tension error signal ($\epsilon=\Delta T=T_0-Tmis$) supplied from the output of said subtractor, and generating at its output a drive signal ($\omega$) capable of operating said motorized movement device to vary said distance (Dp).

18. The optical fibre processing system according to claim 17, wherein said controller comprises a proportional-integral derivative controller.

19. The optical fibre processing system according to claim 17, wherein said tension measuring device comprises a load cell connected to said fixed pulley and capable of generating at its output said signal (Tmis) proportional to the tension to which the optical fiber is subjected.

20. The optical fibre processing system according to claim 17, wherein said motorized movement device comprises a guide along which a slide supporting said movable pulley is capable of being moved, and an actuator device for moving said slide along said guide; and wherein said electronic control device further comprises closed-loop control of a position of said slide along said guide.

21. The optical fibre processing system according to claim 20, wherein said system for the closed-loop control of the position of said slide along said guide comprises:

a further subtractor, receiving at its input a position reference signal ($P_0$) correlated with a reference position of said slide along said guide and a position signal (Pmis) proportional to the actual position of said slide along said guide, and generating at its output a position error signal ($\epsilon=\Delta P=P_0-Pmis$); and a further controller, receiving at its input the position error signal ($\epsilon=\Delta P=P_0-Pmis$) supplied from the output of said further subtractor, and generating at its output a further drive signal ($\omega b$) capable of operating said storage device.

22. The optical fibre processing system according to claim 21, wherein said further controller comprises a proportional-integral derivative controller.

23. The optical fibre processing system according to claim 21, wherein said storage device comprises at least one motorized reel on which the optical fibre from said tensioning device is wound;

wherein said motorized reel is rotationally movable about an axis of rotation under the action of an electric motor; and wherein said further drive signal ($\omega b$) is usable for the control of said electric motor.

24. The optical fibre processing system according to claim 21, wherein said electronic control device comprises an integrator receiving at its input a signal (V) correlated with the speed of movement of said slide along said guide and generating at its output said position signal (Pmis) proportional to the actual position of said slide along said guide.

25. A method of processing an optical fibre along a path of advance of the optical fibre, comprising:

forming a portion of said path having a length (Dp) capable of being varied to modify the tension applied to said fibre;

measuring the tension applied to the optical fibre;

controlling said length (Dp) in an automatic way, by means of a motor, in accordance with said measured tension to keep the tension applied to the optical fibre essentially constant; and storing the optical fibre at the end of said advance path.

26. The method of processing an optical fibre according to claim 25, wherein said controlling comprises performing closed-loop control of the tension applied to said optical fibre in accordance with at least one reference signal (To) proportional to a target tension of the fibre, and at least one measurement signal (Tmis) generated in measuring the tension and proportional to the tension to which the optical fibre is actually subjected.

27. The method of processing an optical fibre according to claim 26, wherein said performing closed-loop control of the tension comprises:

comparing said at least one tension reference signal (To) with said at least one measurement signal (Tmis);

generating a tension error signal ($\epsilon=\Delta T=T_0-Tmis$);

processing said tension error signal ($\epsilon=\Delta T=T_0-Tmis$); and generating at a first output a drive signal ($\omega$) capable of varying said length (Dp) by means of a motor and keeping the tension in the fibre essentially constant.

28. The method of processing an optical fibre according to claim 25, wherein said controlling includes performing closed-loop control of the position of a movable member in accordance with at least one position reference signal ($P_0$)

proportional to a target position of said movable member and a position signal (Pmis) proportional to the instantaneous position of said movable member;

wherein said performing closed-loop control of the position of the movable member includes varying the position of said movable member to vary said length (Dp).

29. The method of processing an optical fibre according to claim 28, wherein said performing closed-loop control of the position of said movable member comprises:

comparing said position reference signal ($P_0$) with said position signal (Pmis);

generating a position error signal ($\epsilon=\Delta P=P_0-Pmis$);

processing said position error signal ($\epsilon=\Delta P=P_0-Pmis$); and generating at a second output a drive signal ($\omega b$) capable of modifying the speed at which the optical fibre is stored.

* * * * *

UNITED STATES PATENT AND TRADEMARK OFFICE
CERTIFICATE OF CORRECTION

PATENT NO.    : 6,595,454 B2
DATED         : July 22, 2003
INVENTOR(S)   : Giacomo Stefano Roba et al.

It is certified that error appears in the above-identified patent and that said Letters Patent is hereby corrected as shown below:

Column 12,
Line 44, "signal (To)" should read -- signal ($T_0$) --.

Column 14,
Lines 47 and 55, "signal (To)" should read -- signal ($T_0$) --.

Signed and Sealed this

Third Day of February, 2004

JON W. DUDAS
*Acting Director of the United States Patent and Trademark Office*